(12) United States Patent
Hindermeyer et al.

(10) Patent No.: US 8,996,424 B2
(45) Date of Patent: Mar. 31, 2015

(54) COMPUTERIZED METHOD AND SYSTEM FOR MANAGING WARRANTY SERVICES IN A DIGITAL SYSTEM OR DEVICE

(75) Inventors: Erich Hindermeyer, Dettenhausen (DE); Konrad Gierens, Gaeufelden-Oeschelbronn (DE); Thomas G. Moegerle, Unterensingen (DE); Thomas G. Speidel, Markgroeningen (DE)

(73) Assignees: International Business Machines Corporation, Armonk, NY (US); ADS-TEC GmbH, Leinfelden-Echterdingen (DE)

( * ) Notice: Subject to any disclaimer, the term of this patent is extended or adjusted under 35 U.S.C. 154(b) by 3352 days.

(21) Appl. No.: 10/979,800

(22) Filed: Nov. 3, 2004

(65) Prior Publication Data
US 2005/0092824 A1 May 5, 2005

(30) Foreign Application Priority Data
Nov. 3, 2003 (EP) .................................. 03104066.0

(51) Int. Cl.
*G06Q 10/00* (2012.01)
*G06Q 10/10* (2012.01)
(52) U.S. Cl.
CPC ...................................... *G06Q 10/10* (2013.01)
USPC ........................................... 705/302; 324/426
(58) Field of Classification Search
USPC ............ 705/1, 50, 80, 1.1, 28, 302, 303, 304, 705/305, 308, 317, 318, 342, 346, 347, 705/500; 324/426
See application file for complete search history.

(56) References Cited

U.S. PATENT DOCUMENTS

| | | | | |
|---|---|---|---|---|
| 6,051,976 A | * | 4/2000 | Bertness | 324/426 |
| 6,163,693 A | * | 12/2000 | Rydbeck | 455/418 |
| 6,272,584 B1 | * | 8/2001 | Stancil | 710/241 |
| 6,313,608 B1 | * | 11/2001 | Varghese et al. | 320/132 |
| 7,129,706 B2 | * | 10/2006 | Kalley | 324/426 |
| 2002/0040325 A1 | * | 4/2002 | Takae et al. | 705/26 |

(Continued)

OTHER PUBLICATIONS

Merriam Webster, "Protocol", http://www.merriam-webster.com/dictionary/protocol.*

(Continued)

*Primary Examiner* — Kira Nguyen
(74) *Attorney, Agent, or Firm* — Mark Vallone; Roberts Mlotkowski Safran & Cole, P.C.

(57) ABSTRACT

A digital system or device includes a battery pack as an exemplary functional subunit. In a warranty case determined by an electrical load test for determining its actual charge capacity, a battery check program initializes, via the operating system and an underlying printer, a printout of a warranty certificate. This certificate form, in particular, contains a UID of the underlying battery pack gathered from a ROM implemented in the battery pack. Before generating the printout of the certificate, the UID gathered from the ROM is coded e.g. by the battery check program and only the coded UID is printed. The printout of the warranty certificate thereafter will be delivered to the warranty service provider by the user. After having received the delivered warranty certificate and having checked validity of the user's warranty claim by means of the coded UID the warranty service provider sends a replacement battery pack back to the user. As a consequence, the user can replace the battery pack on its own and therefore does not have to deliver the replaced battery pack to the warranty service provider.

20 Claims, 3 Drawing Sheets

(56) References Cited

U.S. PATENT DOCUMENTS

| | | | |
|---|---|---|---|
| 2002/0186144 A1* | 12/2002 | Meunier | 340/825.28 |
| 2003/0088376 A1* | 5/2003 | Zimmerman et al. | 702/63 |
| 2004/0156489 A1* | 8/2004 | Vishik et al. | 379/102.03 |
| 2004/0251907 A1* | 12/2004 | Kalley | 324/426 |

OTHER PUBLICATIONS

Random House, "Protocol", http://dictionary.reference.com/browse/protocol.*

* cited by examiner

US 8,996,424 B2

COMPUTERIZED METHOD AND SYSTEM FOR MANAGING WARRANTY SERVICES IN A DIGITAL SYSTEM OR DEVICE

INCORPORATION BY REFERENCE

This application claims benefit of priority under 35 U.S.C. §119 to German application serial no. 03104066.0, filed on Nov. 3, 2003, which is incorporated by reference herein in its entirety.

FIELD OF THE INVENTION

The invention generally relates to warranty services concerning replaceable or renewable subunits, namely, for example, batteries, memory chips, hard disk storage drives (HDDs) or even displays, included in digital systems or devices, such as, for example, portable computers (laptops), mobile phones, personal digital assistants (PDAs) or the like. More specifically, the invention relates to a computerized method and system for handling warranty services in such a digital processing environment where the subunit provides an accessible unique identifier.

DESCRIPTION OF RELATED ART

Present digital systems and devices are manufactured in a modular manner including an increasing number of relatively expensive subunits or spare parts which are used-up during operation, or even become defective, and which can be replaced by the end user of the system and device in a warranty case, i.e., failure or non-reliability of that subunit or spare part. A typical subunit is a battery (accumulator) pack for preferred use in a mobile system or device like a mobile phone or laptop.

These subunits or spare parts, in many cases, are characterized in that the likelihood for establishing a warranty case within the warranty (grace) period of typically one or two years, or even longer, is relatively high. In a scenario of a warranty case, according to known warranty case handling methods, the subunit or spare part to be replaced must be sent to a warranty service provider responsible for the underlying system, or device or even the corresponding subunit or spare part for proof purposes concerning a valid warranty claim. The sending of the subunit or spare part adds to the overall costs and time for determination of whether a replacement is proper by the warranty service provider. Also, the sending of such parts further adds to the administration efforts of the warranty service provider, e.g., determining whether the subunit or spare part is under warranty, disposing of the subunit or spare part, etc.

It is desirable to provide a digital device or system that avoids the above disadvantages.

BRIEF SUMMARY OF THE INVENTION

In one aspect, the invention is directed to a computerized method and system for handling warranty services in a digital processing environment with less time and resource efforts than the known approaches. The invention, in one embodiment, avoids the additional costs and time for sending a subunit or spare part to the warranty service provider, and minimizes any administration efforts of the warranty service provider.

In one aspect of the invention, a user's computer device or system objectively decides when a warranty case of the subunit or spare part is given. In such a warranty case, the subunit or spare part, itself, does not have to be sent to a warranty service provider in order for replacement; instead, the invention provides for a warranty certificate containing a coded identifier of the subunit or spare part, and thus the replacement of that subunit or spare part can be handled without need to send the old subunit or spare part. The invention therefore implements a more objective and remote diagnosis warranty determination on the side of the digital system or device, as described in more detail hereinafter.

In one exemplary scenario, the digital system or device includes, as a replaceable or renewable subunit or spare part, an intelligent battery pack. In a warranty case determined by an electrical load test for determining the actual charge capacity, the battery check program initializes, via the operating system and an underlying printer, a printout of a warranty certificate form. This certificate, in particular, may contain a unique identifier (UID) of the underlying battery pack gathered, e.g., from a Read-only memory (ROM) implemented in the battery pack. Before generating the printout of the certificate, the UID gathered from the ROM is coded e.g., by the battery check program, and only the coded UID is printed. The printout of the warranty certificate thereafter will be delivered to the warranty service provider by the user.

After having received the delivered warranty certificate and having checked the validity of the user's warranty claim by means of the coded UID, the warranty service provider may then send a replacement battery pack back or other appropriate part to the user. As a consequence, the user can replace the battery pack and therefore does not have to deliver the replaced battery pack to the warranty service provider.

The proposed warranty service approach thus gives an objective measure of the physical state and reliability of the underlying subunit, preferably the maximum charge capacity of a battery pack, and avoids resending the subunit one or even more times between the user and the warranty service provider.

BRIEF DESCRIPTION OF THE DRAWINGS

Referring to the accompanied drawings, the invention is described in more detail by way of embodiments from which further features and advantages become evident. In the drawings.

DETAILED DESCRIPTION OF THE INVENTION

Figure 1:
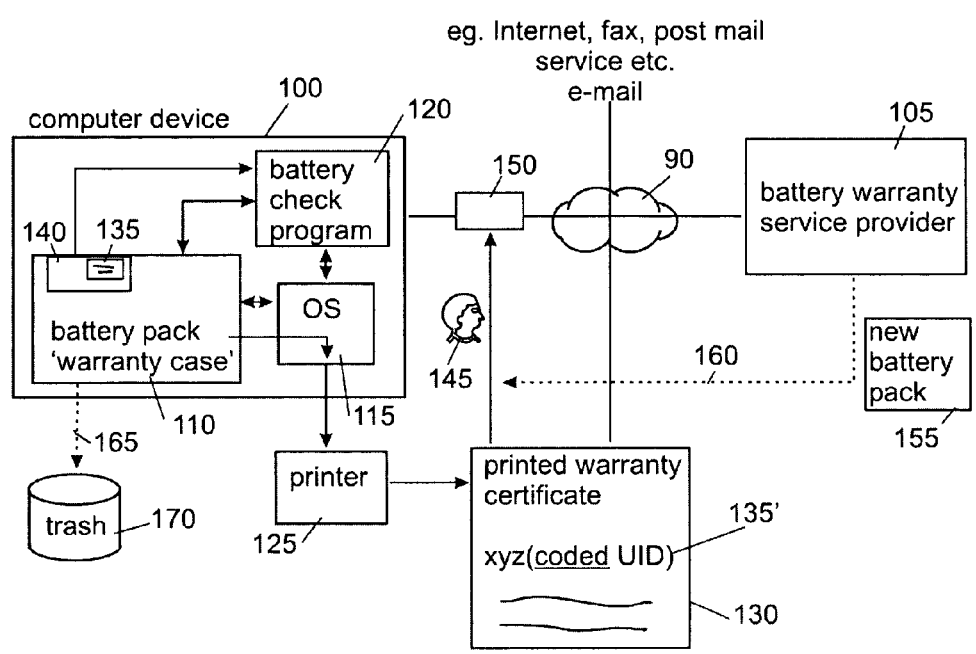
FIG. 1 is a schematic overview of a computer device and a technical warranty service environment having implemented an intelligent battery pack and a battery warranty process according to the invention.

FIG. 1 depicts a schematic overview of an environment including a user's 145 computer device 100 and a warranty service provider 105 interconnected by an electronic communication line or mailing network 90 and an underlying warranty data flow in accordance with the invention. The warranty service provider 105 can be either a separate legal entity or even the manufacturer or seller of the computer device 100, itself. The computer device 100 can be any device or system comprised of independent subunits like portable computers, mobile phones, or even consumer electronic devices like mp3-players, digital photo cameras or video camcorders or any other non-portable digital device comprising, e.g., a Li-ion battery as described in the following.

The computer device 100 includes a schematically drawn Lithium ion (Li-ion) battery (accumulator) pack 110 as an exemplary functional subunit or spare part of the computer device 100. However, instead of the shown battery pack 110, the following described warranty service can also be applied to other mechanical or electrical computer subunits which undergo wear and tear over a relatively short time period (likely within a pending warranty period) and which can be replaced independently of the other computer subunits like the previously mentioned hard disk drives (HDDs), memory chips, displays or the like. Accordingly, the use of the Li-ion battery is not to be construed as a limiting feature of the invention; instead, the discussion of the Li-ion battery should be construed as an exemplary illustration.

The computer device 100 further includes an operating system (OS) 115 for operating the computer device 100 such as, for example, Win32, WinCE, UNIX, LINUX™ or any other known OS. The OS 115 is interacting with an application running on top of the OS 115, namely a battery check program 120 according to the invention.

In case of a warranty case determined by the method described in greater detail, the battery check program 120 initializes, via the OS 115 and an underlying printer 125, a printout of a warranty certificate 130. This certificate form 130, in particular, may contain a unique identifier (UID) 135 of the underlying battery pack 110 gathered from a Read-only Memory (ROM) 140 implemented in the battery pack 110. Before generating the printout of the certificate 130, the UID 135 gathered from the ROM 140 may be coded, e.g., by the battery check program 120 and only the coded UID 135' is printed.

The coding can be accomplished by utilizing a private key/public key mechanism well-known in the art, or any other known coding mechanism. The warranty service provider 105 should know the private key in order to enable the warranty service provider 105 to decode the original UID 135 of the underlying battery pack 110 from the coded UID 135' by using known decoding technology.

The printout of the warranty certificate 130 thereafter will be delivered to the warranty service provider 105 by the user 145, e.g., by means of a telefax device 150, electronic mail (email) attachment via the network 90 or the like. However, instead of using the printout, the certificate 130 can also be delivered to the warranty service provider 105 in an electronic format, e.g., as the mentioned e-mail. On the other hand, the printed form of the certificate 130 can be delivered also using common post mail delivery services or the like. It must be emphasized that the certificate delivery service, due to the coded UID 135', does not have to be secure against any kind of misuse.

After having received the delivered warranty certificate 130 and having checked the validity of the user's 145 warranty claim by means of the coded UID 135', which in the following is being referred to as "Replacement ID", the warranty service provider 105 sends a (new) replacement battery pack 155 back to the user 145, as indicated by the dotted line 160.

Still referring to FIG. 1, the dotted line 165 may indicate that the user 145 now can replace the battery pack 110 in the computer device 100, on the device side, and dispose of the "spent" part in a special trash 170 preferably complying with existing environmental protection regulations. In this manner, the user therefore does not have to deliver the battery pack 110 to be replaced by the new one 155 to the warranty service provider 105, which is advantageous.

Figure 2:
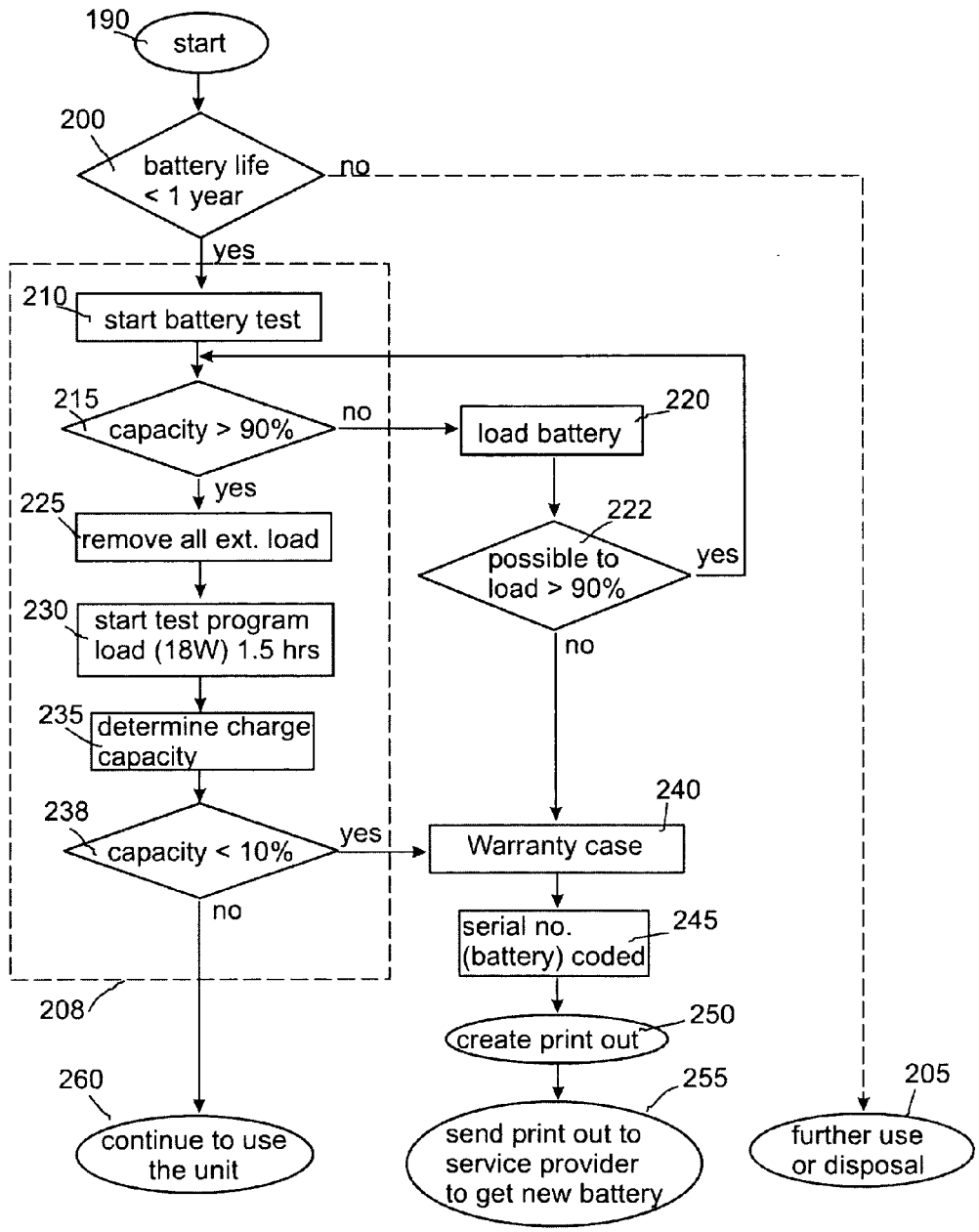
FIG. 2 is a flow diagram illustrating a typical battery warranty check procedure according to a preferred embodiment of the invention.

The above mentioned battery warranty process for determination of a battery warranty case and for handling replacement of an according subunit is described in more detail referring to FIG. 2. However, it should be understood by those of ordinary skill in the art that the steps implemented in FIG. 2 may equally be used for other warranty cases, without departing from the scope of the invention. For example, the steps may equally be implemented for hard disk drives (HDDs), memory chips, displays or the like. FIGS. 2 may equally represent a high-level block diagram of components of the invention implementing the steps thereof. The steps of FIG. 2 may be implemented on computer program code in combination with the appropriate hardware. This computer program code may be stored on storage media such as a diskette, hard disk, CD-ROM, DVD-ROM or tape, as well as a memory storage device or collection of memory storage devices such as read-only memory (ROM) or random access memory (RAM). Additionally, the computer program code can be transferred to a workstation over the Internet or some other type of network.

After user-initiated start 190 of the following described procedure, in a first step 200, it is determined if the battery life of the underlying Li-ion battery pack 110, or its purchase date respectively, is lower than an underlying warranty period, in the present example assumed to be one year. If the warranty period has already been exceeded, even if the charge capacity seems for the user to be too low, then the user can decide whether to further use or dispose of the battery pack (step 205).

Otherwise, a battery test (reliability check) program according to the invention indicated by a dotted frame 208, in the present embodiment a Win32 application, for determining a potential warranty case and for securely handling the potential warranty process for the Li-ion battery pack 110 is started, in step 210. It is emphasized that the user of the computer device 100 can initiate the start of the battery test routine and thus the user can decide whether to claim warranty for the tested battery pack or not at all.

After start 210 of the test routine, it is first checked, in step 215, if the battery pack 110 is presently charged to at least 90 percent of its actual charge capacity, for example. Of course other charge capacities can also be implemented. If the actual charge of the battery pack 110 is lower than 90 percent then the user is requested, in step 220, to charge the pack accordingly. If it is determined in step 222 that the battery pack 110 can be charged with a load greater than 90 percent then the procedure reverts back to step 215 in order to continue with the further steps of the battery test program. Otherwise, the test program is finished and it is continued with step 240 described in the following in more detail where an underlying warranty case is assumed.

If the battery pack 110 is charged greater than 90 percent then the user is informed, in step 225, that, if the test program shall be continued, the external power supply has to be removed, all running applications to be closed and that the check procedure will run at least a specific time, e.g. 1.5 hours.

During the battery test program, a standardized electrical system load (i.e., entire load of the underlying computer device) of 18 Watt in the present example is continuously generated in step 230 in order to determine if the battery pack is keeping or meeting a minimum running time of, e.g., 1.5 hours (hrs). In step 235, the remaining electrical charge capacity after that load test is determined.

If step 235 reveals a capacity of less than 10%, in step 238, that the operation or running time of the battery pack 110 under the mentioned electrical load conditions is lower than 1.5 hours, i.e., that the remaining charge capacity is lower than 10 percent, then it is concluded in step 240 that the battery pack 110 does not comprise a sufficient charge capacity in order to guarantee the necessary reliability of the battery-operated computer device 100 and thus a warranty case is established. Otherwise the user is informed, in step 260, that use of the present battery pack can be continued with the necessary reliability.

It should be mentioned that there may be an exception of a warranty case, e.g., a low charge capacity due to false handling of the battery pack 110 by the user 145 like a user-caused battery cell destructive excess temperature or the like. Such a warranty exception can be determined by means of the above mentioned intelligence of the battery pack 110.

Thus two possible results of the battery test procedure can be:
1. "Battery check program has been run 1.5 hours—Battery OK—End of Program";
2. "Battery check has been run less than 1.5 hours—Actual entire Battery charge capacity is X percent (e.g., 95 percent) of the original charge capacity of y Wh (e.g., 60 Wh)—Warranty case determined—End of Program".

In the $2^{nd}$ scenario, the user 145 initiates generation, in step 245, of a test report (above-mentioned warranty certificate) preferably in form of a printout 250 which contains the actual serial number of the underlying battery pack 110 in the previously described coded format generated by a coding algorithm of the coding algorithms well-known in the art. This algorithm may be, for example, the Huffman encoding algorithm or the like. The Replacement ID can also be generated by the battery test program itself.

Due to the coded format, the generated warranty claim or title, respectively, is nearly 100 percent safe against counterfeit. This printed document, in the present embodiment the necessary warranty title to claim warranty, has to be sent in step 255, to the warranty service provider 105 in order to initiate the warranty process for efficient replacement of the battery pack 110.

By using the above method to implement a warranty claim process, the delivery of a replacement battery pack to the user can be handled without return of the used or defective battery pack to the warranty service provider 105. It is further advantageous to protocol each coded 'Replacement ID' on side of the warranty service provider 105 in order to prevent that for each Replacement ID only one battery pack can be requested by the user 145 or will be delivered to the user, respectively, at a time.

Figure 3:
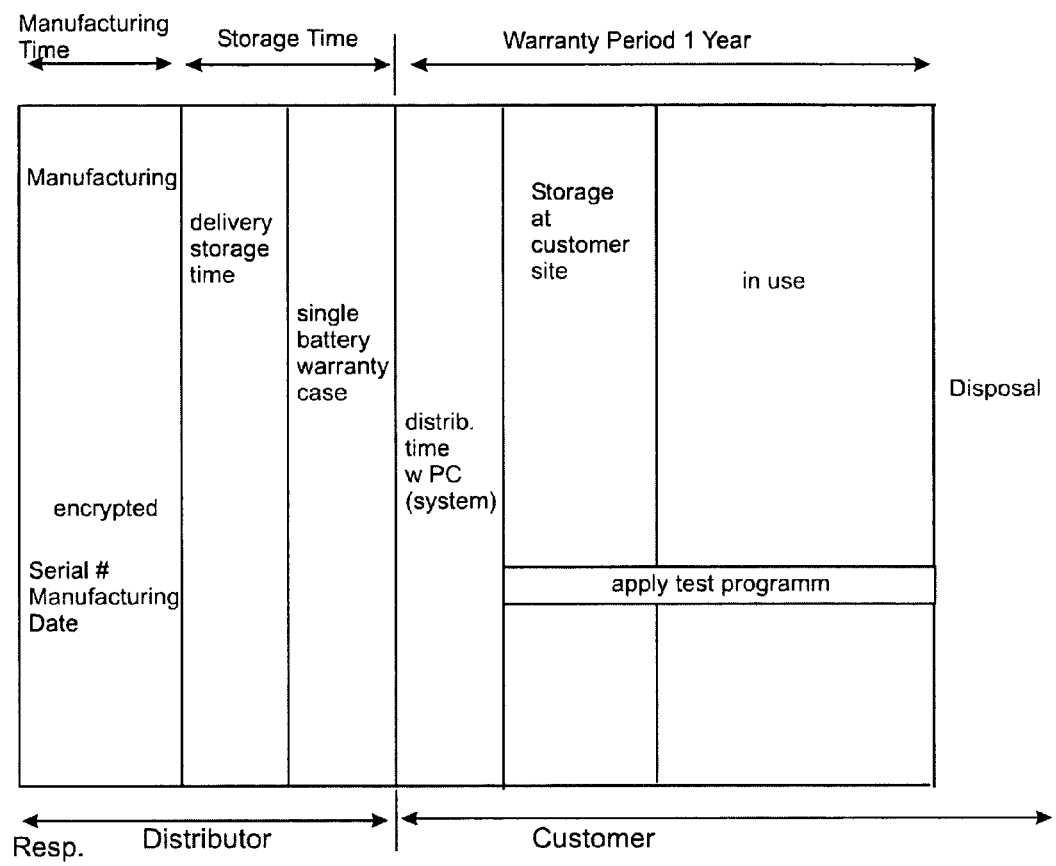
FIG. 3 is a more general view of a warranty process in accordance with the invention.

FIG. 3 depicts a schematic overview of the whole battery warranty process according to the invention under business method aspects by means of a timing diagram. The time scale of the timing diagram drawn in the horizontal direction distinguishes between a manufacturing time period where the underlying battery pack 110 is being made, a storage time after manufacturing in an intermediate or warehouse storage plant or the like and a warranty time period on side of the user (customer) that starts after purchase of the battery pack 110. The warranty process steps necessary within the first two time periods, namely the manufacturing and storage time, are conducted on the side of the battery manufacturer, distributor or seller wherein during the warranty time period all necessary process steps are fulfilled by both the manufacturer (distributor or seller) and the end customer (user).

During the storage time period, the battery pack 110 is underlying a delivery storage time during which already a single battery warranty case can occur. The above described warranty process will not be applied during this period of time. During the storage time period the battery pack 110 will be built in a computer device or system to be distributed during a distribution time period. This distribution will lead into a purchase of such a computer device or system and with that purchase the warranty time period will start. After that the customer may even store the battery pack at a customer site and be entering the battery pack into use later on. The above described warranty process can only be applied during that warranty time period.

Alternatively, in contrast to generation of the coded Replacement ID after having gathered the serial (ID) number from the battery pack's 110 ROM 140, the encoding (encryption) can already been done during the manufacturing of the battery pack 110. The coded ID in this scenario is already stored in the ROM 140.

While the invention has been described in terms of preferred embodiments, those skilled in the art will recognize that the invention can be practiced with modification within the spirit and scope of the appended claims.

What is claimed is:

1. A computerized method for handling warranty services related to a renewable subunit of a user's digital system or device by a warranty service provider, wherein the renewable subunit provides a readable unique identifier, the method comprising the steps of:
   applying, by the digital system or device, a test procedure on the renewable subunit in order to determine functionality or reliability of the renewable subunit, wherein the applying the test procedure is initiated by a user of the digital system or device;
   determining, by the digital system or device, a valid warranty claim dependent on the determined functionality or reliability of the renewable subunit;
   in case of a determined valid warranty claim, gathering the unique identifier from the renewable subunit and generating a warranty certificate including the unique identifier, wherein the generating the warranty certificate is initiated by the user;
   delivering the warranty certificate to the warranty service provider;
   determining, at the warranty service provider, the validity of the warranty claim by the unique identifier of the renewable subunit;
   protocoling the unique identifier at the warranty service provider in order to make certain that only one renewing subunit is delivered to the user at a time; and
   if valid, delivering, at the warranty service provider, a renewing subunit to the user.

2. The method according to claim 1, wherein the unique identifier is encoded before the delivery to the warranty service provider.

3. The method according to claim 2, wherein the warranty certificate together with the encoded unique identifier is printed-out and the printout is delivered to the warranty service provider by facsimile or post mail transmission.

4. The method according to claim 2, wherein the warranty certificate is delivered to the warranty service provider in electronic form.

5. The method according to claim 1, wherein the unique identifier of the renewable subunit is gathered from a read-only memory included in the subunit.

6. The method according to according to claim 1, wherein: the renewable subunit is a battery pack, and the test procedure applied on the battery pack to determine its reliability is an electrical load test.

7. A computer program product comprising at least two computer programs stored on computer usable media for handling warranty services related to a rechargeable battery pack of a user's digital system or device by a warranty service provider, wherein the computer usable media is not a transitory signal per se, the battery pack provides a readable unique identifier, and the at least two computer programs comprise:

a first program, residing at the digital system or device, which determines whether a warranty period for a warranty on the battery pack has expired;

a second program, residing at the digital system or device, when the warranty period for the battery pack is valid, the second program applies a test procedure on the battery pack in order to determine functionality or reliability of the battery pack, the test procedure comprises:

determining, prior to performing an electrical load test, whether the battery pack is charged to at least a first predetermined threshold of a charge capacity of the battery pack;

when the battery is charged to less than the first predetermined threshold, instructing the user to charge the battery pack and determine if it is possible to charge the battery pack to 90%;

when the battery pack is charged equal to or greater than the first predetermined threshold, informing the user to remove any external power supply prior to performing the electrical load test;

performing the electrical load test by generating a continuous electrical load with the battery pack in order to determine whether the battery pack is capable of meeting a minimum predetermined running time; and determining a remaining charge capacity of the battery pack after the minimum predetermined running time, wherein the test procedure is initiated by a user of the digital system or device;

a third program, residing at the digital system or device, when it is determined that the battery pack cannot be charged to the first predetermined threshold or when the remaining charge capacity of the battery pack is less than a second predetermined threshold after the minimum predetermined running time, the third program determines whether the battery pack was falsely handled by the user;

a fourth program, residing at the digital system or device, which determines a valid warranty claim dependent on whether it is determined that the battery pack cannot be charged to the first predetermined threshold or the remaining charge capacity of the battery pack is less than the second predetermined threshold after the minimum predetermined running time, and it is determined that the battery pack was handled correctly by the user;

a fifth program, residing at the digital system or device, which gathers the unique identifier from the battery pack in case of a determined valid warranty claim, codes the unique identifier using a coding algorithm and generates a warranty certificate including the encoded unique identifier, wherein the generating the warranty certificate is initiated by the user;

a sixth program, residing at the digital system or device, which delivers or initiates delivery of the warranty certificate to the warranty service provider;

a seventh program, residing at the warranty service provider, which determines the validity of the warranty claim by the encoded unique identifier of the battery pack;

an eighth program, residing at the warranty service provider, which protocols the encoded unique identifier at the warranty service provider in order to make certain that only one battery pack is delivered to the user at a time; and a ninth program, residing at the warranty service provider, which delivers or initiates delivery of a new battery pack back to the user.

8. A computer program product for handling warranty services related to a renewable subunit, the computer program product comprising:

a computer readable storage medium, wherein the computer readable storage medium is not a transitory signal per se;

first program instructions to apply, at a digital system or device, a test procedure on the renewable subunit in order to determine functionality or reliability of the renewable subunit, wherein the applying the test procedure is initiated by a user of the digital system or device;

second program instructions to determine, at the digital system or device, a valid warranty claim dependent on the determined functionality or reliability of the renewable subunit;

third program instructions to gather the unique identifier from the renewable subunit in case of a determined valid warranty claim, and generate a warranty certificate including a unique identifier, wherein the generating the warranty certificate is initiated by the user;

fourth program instructions to deliver the warranty certificate to the warranty service provider;

fifth program instructions to determine, at the warranty service provider, the validity of the warranty claim by the unique identifier of the renewable subunit;

sixth program instructions to protocol the unique identifier at the warranty service provider in order to make certain that only one renewing subunit is delivered to the user at a time; and seventh program instructions to deliver, at the warranty service provider, a renewing subunit back to the user, wherein the first through seventh program instructions are stored on the computer readable storage medium.

9. A computer system for handling warranty services related to at least one renewable subunit, the system comprising:

a CPU, a computer readable memory and a computer readable storage medium;

first program instructions to apply a test procedure on the at least one renewable subunit in order to determine functionality or reliability of the at least one renewable subunit, wherein the applying the test procedure is initiated by a user of the device;

second program instructions to determine a valid warranty claim dependent on the determined functionality or reliability of the at least one renewable subunit;

third program instructions to gather a unique identifier from the at least one renewable subunit in case of a determined valid warranty claim, and generate a warranty certificate including the unique identifier, wherein the generating the warranty certificate is initiated by the user; and fourth program instructions to deliver the warranty certificate to a warranty service provider;

fifth program instructions to determine the validity of the warranty claim at the warranty service provider by the unique identifier of the at least one renewable subunit;

sixth program instructions to protocol the unique identifier at the warranty service provider in order to make certain that only one renewing subunit is delivered to the user at a time wherein:
the warranty service provider delivers a renewing subunit back to the user, and
the first through sixth program instructions are stored on the computer readable storage medium for execution by the CPU via the computer readable memory.

10. A system, including:
a device comprising at least one renewable subunit providing a readable unique identifier, an operating system residing on the device, a program, which resides at the device and runs on the operating system, for:
  applying a test procedure on the renewable subunit in order to determine functionality or reliability of the renewable subunit, wherein the applying the test procedure is initiated by a user of the device;
  determining a valid warranty claim dependent on the determined functionality or reliability of the renewable subunit;
  gathering the unique identifier from the renewable subunit in case of a determined valid warranty claim and for generating a warranty certificate including the unique identifier, wherein the generating the warranty certificate is initiated by the user;
  delivering or initiating delivery of the warranty certificate to a warranty service provider; and
a program, which resides at the warranty service provider, for:
  determining the validity of the warranty claim by means of the encoded unique identifier of the renewable subunit;
  protocoling the unique identifier in order to make certain that only one renewing subunit is delivered to the user at a time; and
  delivering or initiating delivery of a renewing subunit back to the user.

11. The method according to claim 1, further comprising determining whether a warranty period has expired before performing the applying.

12. The method according to claim 6, further comprising:
determining, prior to performing the electrical load test, whether the battery pack is charged to at least a predefined percentage of a charge capacity of the battery pack;
  when the battery is charged to at least the predefined percentage, informing the user to remove any external power supply prior to performing the electrical load test; and
  when the battery is charged to less than the predefined percentage, instructing the user to charge the battery and determining if it is possible to charge the battery to the predefined percentage.

13. The computer program product according to claim 7, wherein the computer usable medium comprises one of: a diskette, hard disk, CD-ROM, DVD-ROM, and tape.

14. The computer program product according to claim 8, wherein the computer readable storage medium comprises one of: a diskette, hard disk, CD-ROM, DVD-ROM, and tape.

15. The computer program product according to claim 8, further comprising eighth program instructions to encode the unique identifier before the delivery to the warranty service provider, wherein the eighth program instructions are stored on the computer readable storage medium.

16. The computer program product according to claim 15, further comprising ninth program instructions to initiate a print-out of the warranty certificate together with the encoded unique identifier, wherein the ninth program instructions are stored on the computer readable storage medium.

17. The computer program product according to claim 15, further comprising ninth program instructions to deliver the warranty certificate to the warranty service provider in electronic form, wherein the ninth program instructions are stored on the computer readable storage medium.

18. The computer program product according to claim 8, further comprising eighth program instructions to gather the unique identifier of the renewable subunit from a read-only memory included in the renewable subunit, wherein the eighth program instructions are stored on the computer readable storage medium.

19. The computer program product according to claim 8, wherein the renewable subunit is a battery pack and the computer program product further comprises eighth program instructions to apply an electrical load test on the battery pack, wherein the eighth program instructions are stored on the computer readable storage medium.

20. The computer program product according to claim 7, wherein the first predetermined threshold is 90% and the second predetermined threshold is 10%.

* * * * *